United States Patent [19]

Jackson

[11] 4,132,382

[45] Jan. 2, 1979

[54] PINCH VALVE SLEEVE CONSTRUCTION

[76] Inventor: Lawrence D. A. Jackson, 5235 Henri Bourassa, Montreal, Quebec, Canada, H4R 1B8

[21] Appl. No.: 755,576

[22] Filed: Dec. 29, 1976

[30] Foreign Application Priority Data

Jan. 11, 1976 [CA] Canada ............................... 264773

[51] Int. Cl.² .............................................. F16K 7/07
[52] U.S. Cl. ........................................ 251/5; 138/109; 138/125; 138/138; 138/153; 138/174; 285/55
[58] Field of Search ....................................... 251/4–10; 138/126, 127, 137, 140, 141, 146, 109, 138, 153, 174; 285/55, 149

[56] References Cited

U.S. PATENT DOCUMENTS

| | | | |
|---|---|---|---|
| 1,883,086 | 10/1932 | Swartz | 285/55 X |
| 2,146,218 | 2/1939 | Kimmich et al. | 285/238 X |
| 2,359,952 | 10/1944 | Welger | 285/55 |
| 2,911,236 | 11/1959 | Thibault | 285/238 X |
| 3,724,807 | 4/1973 | Jackson | 251/7 |
| 3,899,006 | 8/1975 | Champleboux et al. | 285/149 X |
| 3,920,049 | 11/1975 | Lippert et al. | 138/126 X |

Primary Examiner—Martin P. Schwadron
Assistant Examiner—Richard Gerard
Attorney, Agent, or Firm—Larson, Taylor and Hinds

[57] ABSTRACT

An open ended sleeve for a pinch valve is disclosed. The sleeve has a resilient tubular body member with an elastomeric liner forming a smooth tubular inner wall. A number of circumferential fabric layers surround the liner and are bonded thereto extending along the full length of the body member, a gum layer surrounds the fabric layer and a mounting flange is provided at each end of the body member, each mounting flange has a rigid annular ring therein having a cross section with rounded corners, the ring having an end face perpendicular to the longitudinal axis of the body and a sloped outer face tapered inward from the end of the sleeve. Fabric layers extend around and are bonded to only the outer face and end face of the ring, thus separation between the fabric layers and the ring does not occur when the sleeve collapses.

6 Claims, 4 Drawing Figures

PINCH VALVE SLEEVE CONSTRUCTION

This invention relates to pinch valves and more particularly to pinch valves having a resilient sleeve contained within a rigid body, the valve works on a pressure differential between the body and the sleeve which collapses the sleeve and closes the valve.

Pinch valves having resilient collapsible sleeves are well known. In restricting the flow in a pinch valve, the sleeves are collapsed either by applying a fluid pressure to the exterior wall of the sleeve causing the sleeve to collapse or by mechanically pinching the sleeve between two positions such that it is squeezed together reducing the interior area of the sleeve, finally closing the valve. Many pinch valves have their sleeves formed of a resilient material which has layers of reinforcing fabric therein to give added strength to the sleeves. The sleeves are often formed with a flange section which can be gripped between the rigid valve body and a connecting pipe, and securely hold the sleeve at each end during the opening and closing of the valve. One use of pinch valves is for conveying abrasive slurries in mining operations.

The flange portion of the sleeve is generally at right angles to the main axial passage through the sleeve. The corner where the flange joins to the main body of the sleeve is where continual flexing occurs and is thus subject to fabric fatigue. When a pinch valve is closed, the sleeve is compressed closing off the passage way therein and in many cases there then occurs a considerable pressure differential between the downstream side of the valve and the upstream side. On the downstream side of the valve, the increase in differential pressure between the exterior closing fluid pressure and the reduced line pressure causes the valve sleeve to attempt to turn itself inside out and the layers of fabric and resilient material at the corners between the flanges and the sleeve may be turned up to 180°. This considerable amount of flexing causes overstressing at this point, which tends to separate the reinforcing layers from each other and the resilient material and eventually causing failure of the sleeve.

Attempts have been made in the past to alleviate this situation by inserting metal inserts at the flange connections, and bonding the layers of fabric thereto. This has only been partially successful however as the layers of reinforcing fabric in the portion of the sleeve adjacent the metal insert flex due to the opening and closing of the valve and in some cases these layers pull away from the metal insert which leads to overstressing in some of the layers of fabric causing eventual failure of the sleeve.

It is an object of the present invention to provide an open ended resilient pinch valve sleeve with a rigid flange at each end about which the sleeve can flex without fabric fatigue failure.

It is a further object of the present invention to provide an open ended resilient pinch valve sleeve having layers of reinforcing fabric wherein each end flange of the sleeve is strengthened by a rigid ring molded therein and the fabric layers do not separate from the ring when the sleeve flexes.

A still further object is to provide a pinch valve sleeve that is retained by bolts holding the flanges of a rigid valve body to standard pipe flanges.

With these and other objects in view, the present invention provides an open ended sleeve for a pinch valve comprising a tubular body member with a smooth tubular inner wall formed of elastomeric material, a plurality of circumferential fabric layers surrounding the inner wall and extending along the length of the body member, a pair of mounting flanges provided at the ends of the body member, each flange having a rigid annular ring therein, in cross section the ring having rounded corners with at least two faces, an end face perpendicular to the longitudinal axis of the body member, and a sloped outer face, the fabric layers extending around and bonded to only the outer face and end face of the ring.

In another embodiment the present invention also provides an open ended sleeve as described heretofore wherein the rigid annular ring is in two sections a first section being annular in shape and adjacent to the tubular inner wall, and the second section positioned outside of the first section triangular or trapezoidal in cross section and having fabric layers extending around the outer face and the end face of the second section and between the first section and the second section.

In drawings which illustrate embodiments of the invention,

Figure 1:
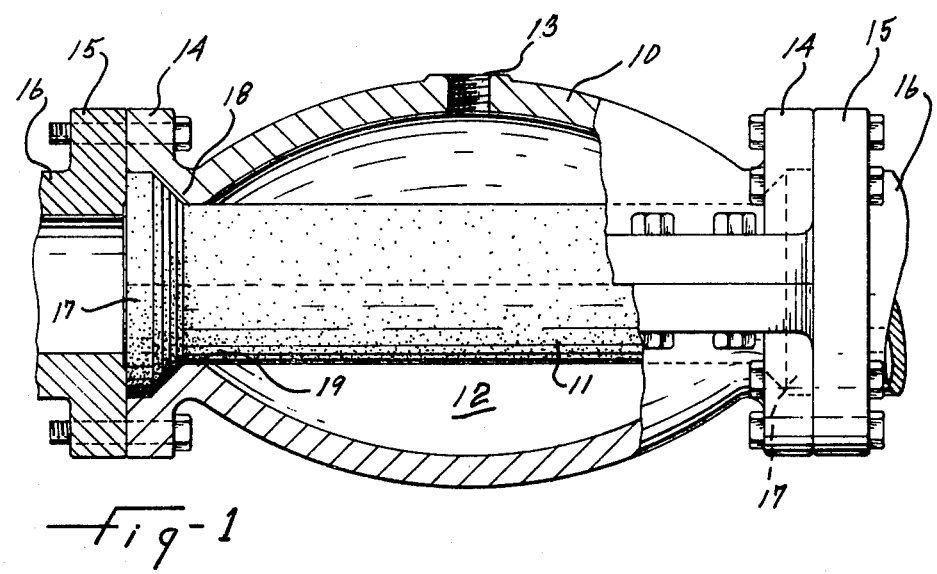
FIG. 1 is a cross-sectional view of a pinch valve showing the sleeve in full elevation.

One embodiment of a pinch valve is shown in FIG. 1 wherein a rigid body 10, preferably made of cast iron, ductile iron, aluminum, steel or other rigid material is shown surrounding an open ended flexible sleeve 11. A space 12 is provided between the rigid body 10 and the sleeve 11 with a pipe connection 13 in the rigid body 10 for permitting fluid under pressure to be inserted into the space 12 and compress the sleeve 11 thus closing the valve. The fluid is preferably air or water. The rigid body 10 has external flanges 14 at each end bolted to the standard flanges 15 of a pipe 16.

The rigid body 10 is formed in two halves split axially along the sleeve axis. Flanges are provided at the mating surfaces and the halves are bolted together through the flanges.

The flexible sleeve 11 has mounting flanges 17 at each open end. Each mounting flange 17 has a large external diameter at the end with a tapered surface 18 extending to the main body of the sleeve 11. An internal shoulder 19 of the rigid body 10 has a tapered face with a similar slope to the tapered surface 18 of the sleeve. Thus the mounting flange 17 of the sleeve 11 is firmly held between the shoulder 19 of the rigid body 10 and the flange 15 of a pipe 16.

Figure 2:
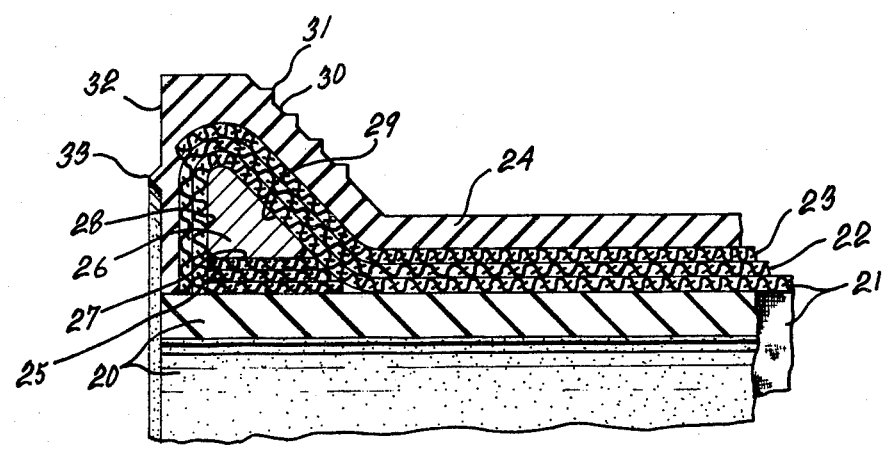
FIG. 2 is a cross-section view through one embodiment of a flange of a pinch valve sleeve.
Figure 4:
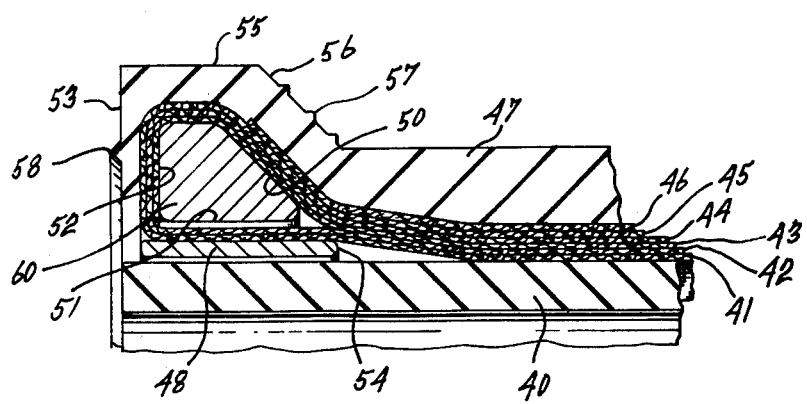
FIG. 4 is a cross section view through a still further embodiment of a flange of a pinch valve sleeve.

One embodiment of the construction of a mounting flange for a flexible sleeve is shown in FIG. 2. A non-corrosive elastomeric liner 20 forms a smooth tubular inner wall and is in contact with the fluid and abrasive materials passing through the valve. Three circumferential layers of fabric 21, 22 and 23 are bonded to the elastomeric liner 20 and have on their outside a gum layer 24. The complete assembly is bonded together forming a single resilient tubular body member. The construction of the sleeve throughout its length may be constant, or may have areas of reinforcement such as that shown in my earlier U.S. Pat. No. 3,724,807 issued Apr. 3, 1973. At each flange the elastomeric liner 20 extends to the extremity of the sleeve. Three narrow annular strips 25 are built up on the liner 20 and support a rigid annular ring 26 having a triangular cross-section with rounded edges. The cross section is a right angle triangle configuration having an inner face 27 parallel to the inner wall of the sleeve and the axis of the sleeve. In another embodiment the cross sectional configuration of the ring is trapezoidal as shown in FIG. 4. An end face 28 of the ring 26 is parallel to the end surface 32 of the sleeve and also perpendicular to the axis of the sleeve. The end face 28 and the inner face 27 of the ring 26 are at right angles to each other. The outer face 29 of the ring 26 is at approximately 45° to the other two faces. The first and second layers of fabric 21 and 22 pass outside the annular ring 26 covering and bonded to the outer face 29 and the end face 28. The third layer 23 follows the contour of the first and second layers 21 and 22 but does not extend down the end face of the ring 26 but terminates at the corner of the end face 28 and the outer face 29 of the ring 26. A layer of gum 24 surrounds the flange and is molded to the required shape. A tapered surface 30 of the sleeve is substantially parallel to the outer face 29 of the ring 26 and serrations 31 are provided along the tapered surface 30 to improve the grip and sealing between the mounting flange of the sleeve and the rigid body. The end surface 32 of the sleeve has a single serration 33 to ensure sealing with the flange of a pipe and also to prevent movement between the mounting flange of the sleeve and the pipe flange.

In FIG. 2 three layers of reinforced fabric, preferably polyester are shown. It will be appreciated that variations in the number of layers may be made depending on the diameter of the sleeve and pressure rating of the valve. In operation, when the valve closes the rigid annular ring 26 retains its position and the sleeve collapses inwards. At the same time the fabric layers 21, 22 and 23 flex inwards and wrap around the rounded corner of the outer face 29 and the inner face 27 of the ring 26. No separation of the layers occurs, because the wrapping around the corner holds them together, and the layers are not pulled away from the ring 26. The built up fabric strips 25 on the inside of the ring 26 do not aid in the strength of the sleeve but merely act as a spacer to position the annular ring from the inner wall 20, and prevent too sharp a bend in the fabric layers 21, 22 and 23 when they flex inwards.

Figure 3:
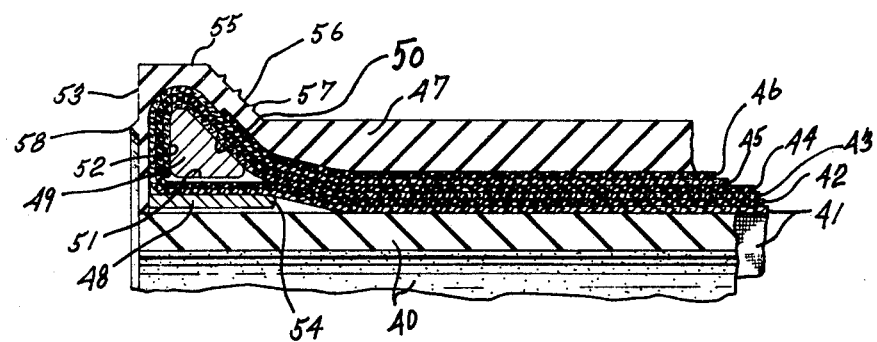
FIG. 3 is a cross-sectional view through another embodiment of a flange of a pinch valve sleeve.

Another configuration of a mounting flange for a sleeve is shown in FIG. 3. A non-corrosive elastomeric liner 40 forms a smooth tubular inner wall. Two circumferential inner layers 41 and 42 of reinforced fabric surround the liner 40, together with three circumferential intermediate layers 43, 44 and 45 and one circumferential outside layer 46 of reinforced fabric, preferably polyester. Surrounding the outer layer 46 is a gum layer 47. The complete assembly is bonded together to form a single resilient tubular body member. At each mounting flange directly above the extremity of the liner 40 is a first lower rigid annular ring 48 and a second upper rigid annular ring 49. The first ring 48 is cylindrical in shape with an inner surface adjacent the outside surface of the liner 40. A small gap remains between these two surfaces which may be filled with gum. The second ring 49 fits over the first ring 48 and has a triangular cross-section with rounded edges. The cross-section of the second ring 49 is a right angle triangle configuration with an outer face 50 having a slope of approximately 45°. The inner face 51 of the second ring 49 is parallel to the cylindrical wall of the first ring 48 and also to the axis of the liner. The end face 52 of the second ring 49 is parallel to the end surface 53 of the sleeve and also perpendicular to the axis of the sleeve. The second ring 49 is spaced from the first ring 48 by the two inner fabric layers 41 and 42 bonded therebetween. The first ring 48 extends axially from the end surface 53 of the sleeve terminating at a rounded end 54 which is substantially in line with a projection of the outer face 50 of the second ring 49. The three intermediate fabric layers 43, 44 and 45 extend over the outer face 50 of the second ring 49 and down the end face 52 being bonded to the two faces of the ring. The first intermediate layer 43 terminates at the bottom of the end face 52 of the second ring 49. The other two intermediate layers 44 and 45 join the inner layers 41 and 42 and form two fabric layer loops surrounding the second ring 49. The outer fabric layer 46 extends half way up the outer face 50 of the second ring 49 and then terminates. The combination of the first ring 48 and the second ring 49 together with the fabric layers and spaces filled with gum form a triangular configuration. A layer of gum 55 surrounds the triangular configuration and is molded to the required flange shape. A tapered surface 56 of the sleeve is substantially parallel to the outer face 50 of the second ring 49 and has a series of serrations 57 thereon to grip the mounting flange of the sleeve to the body of the valve. The end surface 53 of the sleeve has one serration 58 to grip the mounting flange of the sleeve to the flange of a pipe.

When the sleeve collapses the fabric layers tend to flex and wrap around the rounded end 54 of the first ring 48. There is no tendency for the fabric layers to separate one from the other or pull away from the bond between the fabric layers and the rings 48 and 49 when the sleeve collapses and tries to turn itself inside out. The fabric layers are preferably formed from polyester fabric. The rigid rings are preferably formed from ductile cast iron or mild steel, however, non-metallic material is also desirable in some cases. It will be apparent that whereas six layers of polyester fabric are shown in the configuration of FIG. 3, the number of layers could be varied depending on the outside diameter of the sleeve. The configuration of flange arrangements shown in FIG. 3 is suitable for valve sizes above 8" diameter.

The configuration shown in FIG. 4 is substantially the same as that shown in FIG. 3 except that the second upper rigid annular ring 60 is trapezoidal in cross section rather than triangular. The outer face 50, inner face 51 and end face 52 remain the same but the trapezoidal ring 60 has an increased modulus which gives the flange portion additional strength to resist being deformed when the valve is closed.

In the embodiments shown in FIGS. 2 to 4, when the valve closes the fabric layers collapse, flex and tend to wrap themselves around a rigid portion of the ring. In FIG. 2, this rigid portion of the ring is a rounded corner of the triangular cross sectioned ring, whereas in FIGS. 3 and 4, the layers wrap themselves around a rounded end of the first inner ring 48. Thus no separation between the fabric layers occurs and no separation between a fabric layer and a ring occurs when the sleeve collapses and the valve is closed. The shape, construction and configuration of the sleeve flanges is restricted as to space by the necessity of being confined inside the bolts used for the connection of the rigid body flange to the pipe flange.

The embodiments of the invention in which an exclusive property or privilege is claimed are defined as follows:

1. An open ended sleeve for a pinch valve comprising a resilient tubular body member including an elastomeric liner forming a smooth tubular inner wall, a plurality of circumferential fabric layers surrounding the liner and bonded thereto extending along the length of the body member, a gum layer surrounding the fabric layer and bonded thereto, a mounting flange at each end of the body member, a rigid annular ring in each mounting flange, each rigid annular ring comprising a first section and a second section, the first section of the ring being cylindrical in shape and adjacent to the liner, the second section of the ring positioned outside the first section and being triangular in cross section, fabric layers extending around and bonded to the outer face and the end face of the second section and extending between the first section and the second section.

2. The sleeve according to claim 1 wherein the first section of the ring has an end substantially in line with a projection of the end face of the second section of the ring, the first section being parallel to the smooth tubular inner wall and extending beyond the second section to terminate at a rounded end substantially in line with a projection of the outer face of the second section.

3. The sleeve according to claim 1 wherein the first section of the ring and second section of the ring are spaced apart and together form a triangular configuration.

4. The sleeve according to claim 1 wherein six polyester fabric layers are incorporated in the sleeve, and wherein three layers extend around the outer face and end face of the second section of the ring, and two layers are positioned between the second section of the ring and the first section of the ring.

5. An open ended sleeve for a pinch valve comprising a resilient tubular body member including an elastomeric liner forming a smooth tubular inner wall, a plurality of circumferential fabric layers surrounding the liner and bonded thereto extending along the length of the body member, a gum layer surrounding the fabric layer and bonded thereto, a mounting flange at each end of the body member, a rigid annular ring in each mounting flange, each rigid annular ring comprising a first section and a second section, the first section of the ring being cylindrical in shape and adjacent to the liner, the second section of the ring positioned outside the first section and being trapezoidal in cross section, fabric layers extending around and bonded to the outer face and the end face of the second section and extending between the first section and the second section.

6. The sleeve according to claim 5 wherein the first section of the ring and second section of the ring are spaced apart and together form a trapezoidal configuration.

* * * * *